United States Patent
Lawn (10) Patent No.: US 9,874,477 B2
(45) Date of Patent: Jan. 23, 2018

(54) DEVICE FOR MEASURING COLOUR PROPERTIES

(71) Applicant: Richard F. Lawn, Shrewsbury (GB)

(72) Inventor: Richard F. Lawn, Shrewsbury (GB)

(73) Assignee: Richard F. Lawn, Shrewsbury, Shropshire (GB)

( * ) Notice: Subject to any disclaimer, the term of this patent is extended or adjusted under 35 U.S.C. 154(b) by 0 days.

(21) Appl. No.: 15/273,471

(22) Filed: Sep. 22, 2016

(65) Prior Publication Data
US 2017/0082492 A1  Mar. 23, 2017

(30) Foreign Application Priority Data
Sep. 23, 2015  (GB) .................................. 1516842.0

(51) Int. Cl.
G01N 21/25  (2006.01)
G01J 3/50  (2006.01)
G01J 3/02  (2006.01)
G01J 3/46  (2006.01)

(52) U.S. Cl.
CPC .............. G01J 3/50 (2013.01); G01J 3/0297 (2013.01); G01J 2003/467 (2013.01)

(58) Field of Classification Search
CPC .... G01J 3/02; G01J 3/50; G01J 3/0297; G01J 3/0254; G01J 2003/467
See application file for complete search history.

(56) References Cited

U.S. PATENT DOCUMENTS

2016/0334274 A1* 11/2016 Xu ..................... G01J 3/0254

FOREIGN PATENT DOCUMENTS

GB          2474701 B  *  4/2014  ............... G01J 3/02

* cited by examiner

*Primary Examiner* — Jamil Ahmed
(74) *Attorney, Agent, or Firm* — Fish IP Law, LLC; Robert D. Fish (57) ABSTRACT

A method for determining color properties of a target, comprising:
providing an enclosure (10) having first and second opposing end walls (10a, 10b) each having an aperture therein, the first end wall (10a) having, on its surface within said enclosure, a pattern (20) of colored sections arranged around the respective aperture (16), no light source being provided within said enclosure;
placing said first screen (12) over said target;
substantially simultaneously illuminating, through the aperture in the second end wall, said screen overlayed on said target and using said lens module to obtain sensor data representative of at least a portion of light reflected from said screen overlayed on said target and received by said sensor; and
transmitting said sensor data to a remote processing module configured to adjust a color property of said target obtained from respective target parameters derived therefor.

20 Claims, 4 Drawing Sheets

DEVICE FOR MEASURING COLOUR PROPERTIES

This invention relates generally to a device for measuring colour properties and, more particularly but not necessarily exclusively, to a device for conveniently and accurately measuring the colour properties of objects or samples for use in a colour matching system or the like, of particular interest to colour critical industries.

The requirement to precisely measure the colour properties of an object and then make calculations relating to those measurements is large and growing, particularly in colour critical industries, such as the clothing and paint industries for example, where it is a requirement to attain a consistently precise colour match. Indeed, this requirement exists in relation to almost all consumer goods.

The phrase "colour property" is used herein, rather than "colour" because colour is a sensation experienced by the observer and highly dependent on the illumination of the object being viewed (so that two coloured objects may appear to be of very similar colour under one illuminant and quite different under another). The supply chains of colour critical industries require measurements of colour properties of items and components which are independent of illumination type and give information about intrinsic colour properties of the objects measured. The intrinsic data generally used is the proportion of incident illumination energy reflected back by the object at each one of an agreed set of wavelengths throughout the visible spectrum (usually every 10 nm from 400 nm to 700 nm), and this data set is usually referred to as a reflectance measurement and plotted as a reflectance curve.

A single colour picture, taken with even the most sophisticated digital camera, cannot provide this information because it provides only one position in a 3D mathematical colour space (r, g and b being the coordinates, i.e. rgb colour space) of the colour data received from an object under a particular illuminant.

The normal method of taking reflectance measurements is, in fact, to use a spectrophotometer, which again uses a white illuminant but then splits both the light coming direct from the illuminant and that reflected from the object to measure directly and concurrently the amount of direct and reflected energy at each of a set of wavelengths, and so calculate the proportions needed to create the reflectance measurement. Spectrophotometers are typically cumbersome and expensive and generally require connection to a PC to be able to perform colour calculations, and certainly require connection to a PC to communicate colour data to other locations.

It would, therefore, be desirable to provide a simple, easily portable, economical, widely spread and consistent device for making precise colour property measurements of objects and, optionally, communicating those measurements easily to other parties around the globe.

UK Patent No. GB2474701B describes a handheld device for measuring the colour properties of objects wherein an internal digital camera is employed to record light reflected from, or transmitted through, the object, means for guiding light from the object to the lens module of the digital camera, and an application running on the internal processor of the handheld device for making an internet connection and transmitting colour property data derived from the object to a remote location.

Whilst the above-mentioned patent describes an effective method of quickly and conveniently obtaining and transmitting colour property data to a remote location using inexpensive equipment to modify an existing handheld device (such as a mobile phone), an issue still arises in that colour property data can vary greatly, not just as a result of variance in light incident on the target object, but also as a result of variance in the properties of the digital camera itself or the processing system used to generate the colour property data.

It is, therefore, an object of aspects of the present invention to address at least some of these issues, and provide a device for measuring colour properties quickly and conveniently, and in a cost-effective manner, but which also takes into account variance in incident light and the properties of the digital camera and the processing system used therein.

Thus, in accordance with a first aspect of the present invention, there is provided a method for determining colour properties of a target, the method comprising:

providing an enclosure having first and second opposing end walls and one or more side walls, wherein said first end of said enclosure comprises a first screen having a first aperture therein and having, on its surface within said enclosure, a pattern of coloured sections arranged around said first aperture, wherein each coloured section has a known colour property, and wherein said second end of said enclosure comprises a second screen having a second aperture generally axially in line with said first aperture, no light source being provided within said enclosure;

placing said first screen over said target such that a portion of said target is exposed through said first aperture and said pattern of coloured sections is visible through said second aperture;

using a digital camera having a lens module, including a sensor, and a flash module adjacent each other, manually placing said lens module and flash module over said second aperture, directed into said enclosure such that substantially no ambient light can enter said enclosure through said second aperture, and, subsequently, substantially simultaneously illuminating, using only said flash module of said digital camera, said screen overlayed on said target and using said lens module to obtain sensor data representative of at least a portion of light reflected from said screen overlayed on said target and received by said sensor;

deriving, from said sensor data, reference parameters for the colour properties of said target exposed through said first aperture;

deriving, from said sensor data, reference parameters for the colour properties of at least one of said coloured sections;

determining a difference between a colour property of said at least one coloured section obtained from respective reference parameters derived therefor and a known colour property thereof; and using data representative of said difference to adjust a colour property of said target obtained from respective target parameters derived therefor.

In an exemplary embodiment, the sensor data, or data representative thereof, may be transmitted to a remote processing module, said remote processing module being configured to perform the steps of:

deriving, from said sensor data, reference parameters for the colour properties of said target exposed through said first aperture;

deriving, from said sensor data, reference parameters for the colour properties of at least one of said coloured sections;

determining a difference between a colour property of said at least one coloured section obtained from respective reference parameters derived therefor and a known colour property thereof; and using data representative of said difference to adjust a colour property of said target obtained from respective target parameters derived therefor.

The remote processing module may include a catalogue of libraries comprising data representative of respective digital cameras, said data comprising make, model and serial number of the respective digital camera.

The digital camera may be integral with a mobile computing device.

A unique identifier may, optionally, be printed or otherwise provided on said pattern of coloured sections. The pattern of coloured sections may comprise an array of coloured sections, wherein said coloured sections are selected to represent at least a portion of a defined colour space.

In an exemplary embodiment, the digital camera may include a viewfinder display, and the method includes the steps of causing to be displayed thereon, an image of said screen overlayed on said target, and adjusting the lens module so as to align said screen with a displayed image thereof on said viewfinder display. In this case, the step of adjusting said lens module may comprise superimposing a reference image on an image of said screen on said viewfinder display, and aligning said reference image with said coloured sections within said image.

The pattern of coloured sections may comprise a colour grid and said reference image may be a grid outline corresponding generally to the configuration of said colour grid.

The target parameters may include RGB values in respect of said target, and reference parameters include respective RGB values in respect of said coloured sections. In this case, the known colour properties of said colour sections may comprise respective RGB values, and said step of determining a difference may comprise selecting a coloured section having a derived RGB value nearest to that of said target, and subtracting a derived RGB value from a corresponding known colour property. Alternatively, the known colour properties of said colour sections may comprise respective RGB values, and said step of determining a difference value may comprise selecting a plurality of coloured sections having respective RGB values nearest to said RGB value of said target, obtaining an average of said RGB values of said selected coloured sections, and subtracting said average from a corresponding average of said respective known RGB colour properties.

The step of adjusting a colour property may comprise adjusting said colour property by said difference value. Alternatively, the step of adjusting a colour property may comprise determining a scaling factor from said difference value in relation to the known RGB value(s), and applying said scaling factor to said derived target parameter.

In accordance with another aspect of the present invention, there is provided apparatus for determining colour properties of a target, the apparatus comprising:

an enclosure having first and second opposing end walls and one or more side walls, wherein said first end of said enclosure comprises a first screen having a first aperture therein and having, on its surface within said enclosure, a pattern of coloured sections arranged around said first aperture, wherein each coloured section has a known colour property, and wherein said second end of said enclosure comprises a second screen having a second aperture generally axially in line with said first aperture, no light source being provided within said enclosure, said enclosure being configured such that said first screen can be placed over said target, in use, such that a portion of said target is exposed through said first aperture and said pattern of coloured sections is visible through said second aperture;

a remote processing module; and a digital camera having a lens module, including a sensor, and a flash module adjacent each other, for obtaining sensor data representative of at least a portion of light reflected from said screen overlayed on said target and received by said sensor and for transmitting said sensor data to said remote processing module;

said remote processing module being configured to derive, from said sensor data, reference parameters for the colour properties of said target exposed through said first aperture;

derive, from said sensor data, reference parameters for the colour properties of at least one of said coloured sections;

determine a difference between a colour property of said at least one coloured section obtained from respective reference parameters derived therefor and a known colour property thereof; and use data representative of said difference to adjust a colour property of said target obtained from respective target parameters derived therefor.

The digital camera may include a viewfinder display configured, in use, to display thereon, an image of said screen overlayed on said target, and the apparatus may be further configured to enable the lens module to be adjusted so as to align said screen with a displayed image thereof on said viewfinder display. In this case, the apparatus may be configured to superimpose a reference image on an image of said screen on said viewfinder display, and enable or cause said reference image to be aligned, manually or automatically, with said coloured sections within said image.

Once again, the pattern of coloured sections may comprise a colour grid and said reference image may be a grid outline corresponding generally to the configuration of said colour grid.

The pattern of coloured sections may comprise an array of coloured sections, wherein said coloured sections are selected to represent at least a portion of a defined colour space.

In accordance with yet another aspect of the present invention, there is provided apparatus for use in a method substantially as described above, comprising:

an enclosure having first and second opposing end walls and one or more side walls, wherein said first end of said enclosure comprises a first screen having a first aperture therein and having, on its surface within said enclosure, a pattern of coloured sections arranged around said first aperture, wherein each coloured section has a known colour property, and wherein said second end of said enclosure comprises a second screen having a second aperture generally axially in line with said first aperture, no light source being provided within said enclosure; and a mobile application for use in a device including said digital camera comprising at least a lens module and a sensor, said mobile application being configured to, illuminate said screen overlayed on a target through said opening, and obtain sensor data representative of at least a portion of light reflected from said screen overlayed on said target.

The mobile application may be further configured to, in use, generate and superimpose, on a viewfinder display of said digital camera, a reference image corresponding to said pattern of coloured sections when viewed through said lens module and displayed as an image on said viewfinder display for enabling said lens module to be aligned relative to said screen, either manually by a user or automatically.

The device may comprise a light source and the mobile application is configured to automatically operate said light source to illuminate said screen through said opening, in use.

These and other aspects of the invention will be apparent from the following specific description in which embodiments of the present invention are described, by way of examples only, and with reference to the accompanying drawings, in which:

Figure 1A:
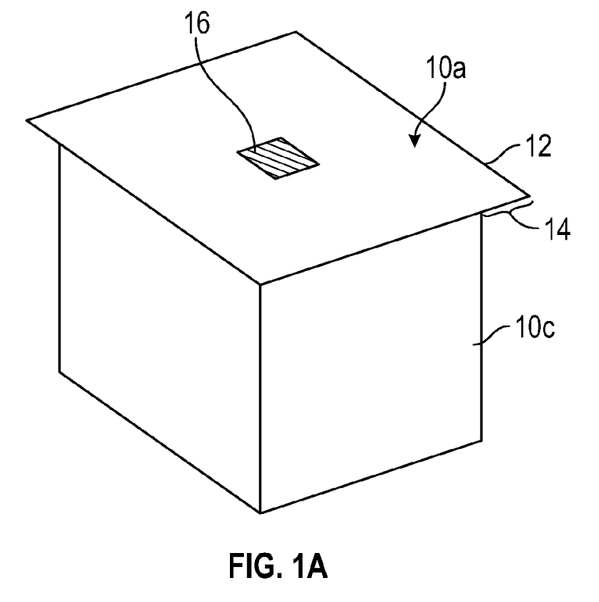
FIG. 1A is a schematic perspective view of a reference guide device for use in apparatus according to an exemplary embodiment of the present invention.
Figure 1B:
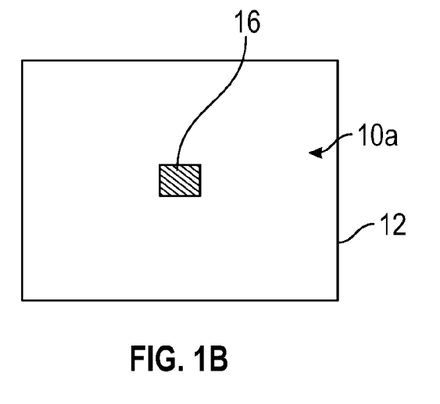
FIG. 1B is a front view of the device of FIG. 1A.
Figure 1C:
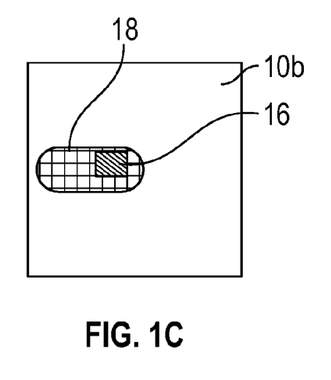
FIG. 1C is a rear view of the device of FIG. 1A.

Referring to FIGS. 1A, 1B and 1C of the drawings a reference guide device for use in an exemplary embodiment of the present invention comprises a box-like enclosure 10 having a first end 10a and an opposing second end 10b with respective side walls 10c therebetween. The first end is covered with a plate 12 having a length and width longer than the respective cross-sectional dimensions of the rest of the enclosure 10, such that the plate 12 extends over the edges of the first end to form an overhanging rim 14. The plate 12 is provided with a generally central, rectangular aperture 16.

The second end 10b of the enclosure 10 is provided with an opening 18. The opening 18 across the surface of the rear end 10b from a location at or near the centre to a point close to or adjacent one of the side walls 10c, and is, in this exemplary embodiment of generally elongate configuration with rounded edges.

Figure 2:
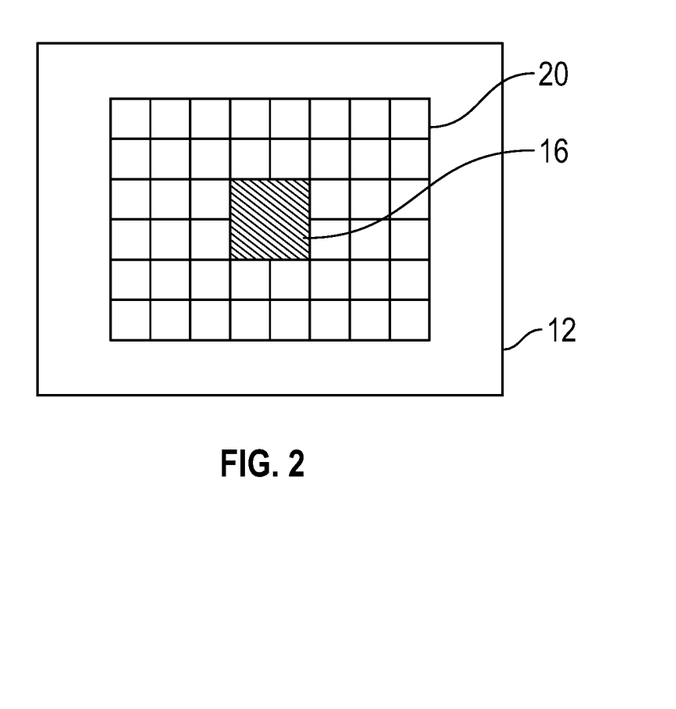
FIG. 2 is a schematic plan view of the inner surface of the screen included in the device of FIG. 1A, illustrating the pattern of coloured sections.
Figure 3:
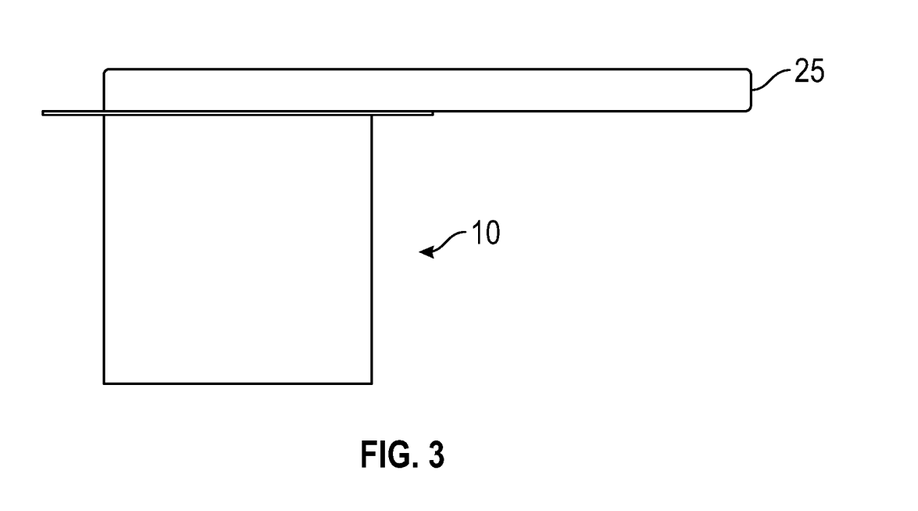
FIG. 3 is a schematic side view of apparatus according to an exemplary embodiment of the present invention, when in use.
Figure 4:
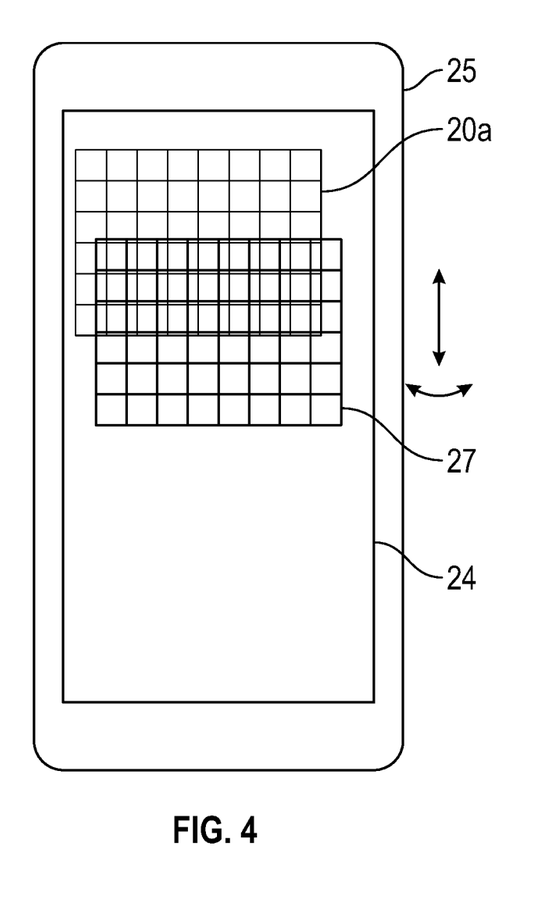
FIG. 4 is a schematic plan view of apparatus according to an exemplary embodiment of the present invention, when in use.

Referring now to FIG. 2 of the drawings, the inner surface of the plate 12 is provided with a colour grid 20 printed thereon, which colour grid comprises an array of square or rectangular colour sections. In the example shown, there are 60 colour sections (an 8 by 8 grid of colours, with four of the colour sections omitted to allow for the central aperture 16. However, in reality, the grid could be of any number of rows and columns and it is thought that the more colour sections that are provided and, therefore, the better "filled" the colour space is with the colours provided, the better (i.e. more accurate) will be the results. A large colour grid 20 overcomes the need for multiple images to be captured and data therefrom analysed. Thus the colour sections are preferably a good mix of colours covering, for example, the CIELab colour space. Referring to FIGS. 3 and 4 of the drawings, in use, a mobile device 25, such as a mobile phone or tablet computer, is employed to capture the image data required to determine the colour properties of a target. Thus, a target is placed on a surface and the reference guide device is placed on the target, with the first end 10a facing down and resting on the target, and the second end 10b (including the elongate opening 18) facing upward. The mobile device, including a digital camera, is placed against the opening 18 such that the lens module (not shown) is located over the opening (facing into the enclosure) and the display screen 24 of the device is facing upward. A mobile application running on the mobile device is, in this exemplary embodiment of the invention, configured to switch on a flash module of the digital camera such that it illuminates the screen overlayed on the target through the opening 18, and to generate and display a grid 27 that matches the configuration of the colour grid 20 on the inside of the plate 12 when viewed on the screen 24 as an image 20a derived from sensor data received at the camera sensor. No further illumination device is required, as the mobile device flash module provides all the necessary light. A user can thus make adjustments to the mobile device (and, therefore, the camera in terms of its relative position over the opening 18 and its orientation such that the image of the colour grid is aligned with the reference grid displayed on the screen 24. (In other exemplary embodiments, however, this alignment step may be performed automatically).

The user can then cause RGB values in respect of the exposed portion of the target and one or more of the colour sections to be derived. At this point, image data representative of the captured image can be caused to be transmitted (by the mobile application) to a remote processing module, via wi-fi or mobile network wireless communication, where the RGB values can be derived. Alternatively, processing of the sensor data may be performed by the internal processor of the mobile device 25 to determine the required RGB values. Preferably though, the processing will occur at a remote processing module, having the advantage that any algorithms used in the derivation of the RGB value can be updated centrally, rather than on each separate mobile device application.

In one exemplary embodiment of the present invention, the remote processing module may further comprise a catalogue of libraries, which collect and keep data relative to mobile device model, make and serial numbers. The reason for this is that flash and camera modules vary between, for example, mobile phones. When the data representative of the captured image is caused to be transmitted to a remote processing module, the application (described in further detail below) can be caused to also send data representative of the mobile device make, model and serial number. The remote processing module can then be caused to compare this information with the information kept in the libraries and make adjustments to the algorithms deriving the RGB values. This has the advantage of modulating the results accounting for variations in, for example, flash module brightness.

It is envisaged that the colour guides 20 will be printed in batches, and so to account for variations between batches the colour guide 20 may have a unique identifier printed somewhere on its surface. The unique identifier may take the form of a barcode, or a QR code, for example. This can be 'seen' by the mobile device's camera module, and data representative of the unique colour guide 20 can be captured and sent to a remote processing module. The remote processing module can then compare this data with other data captured and kept in the libraries, and this data may be analysed and/or used to adjust current algorithms used in deriving RGB values or create batch specific algorithms which account for variations between colour guide printing batches.

There are a number of advantages to having a remote processing module and remote libraries where data is kept, for example on a remote server. Firstly, the data which would be collected by such an application representative of phone make, model and serial number can be used to continuously update the algorithms used in the derivation of the RGB values as more and more data is added to the libraries. Central updating of the algorithms means that the mobile device need only download one version of the application. Furthermore, if the processing was done internally by the mobile devices processor then, to account for the differences between camera and flash modules, a different application would be needed for each phone model, make and serial number.

Either way, processing of the image data by apparatus according to an exemplary embodiment of the invention will now be described in more detail. Thus, referring to FIG. 5 of the drawings, at step 100, the processor determines an RGB value of the target, identified from a location within the captured image corresponding to the centre of the aperture 16. At step 102, the processor determines an RGB value of each of the coloured sections in the colour grid 20, identified from locations within the captured image corresponding to the respective centres of the coloured sections. Next, at step 104, the processor determines from the determined RGB values, which one or more of the coloured sections has an RGB value that most closely matches that of the target. At step 106, a calibration value is calculated. If a single coloured section having the closest RGB value to that of the target is used, then the calibration value can be determined by subtracting the determined RGB value of the coloured section from its known RGB value. In other exemplary embodiments, where a plurality of coloured sections having the most closely matching RGB values to that of the target are to be used, the calibration value may be calculated by first subtracting the determined RGB value of each of the selected coloured sections from its respective known RGB value, and then calculating an average of the calculated difference values.

Figure 5:
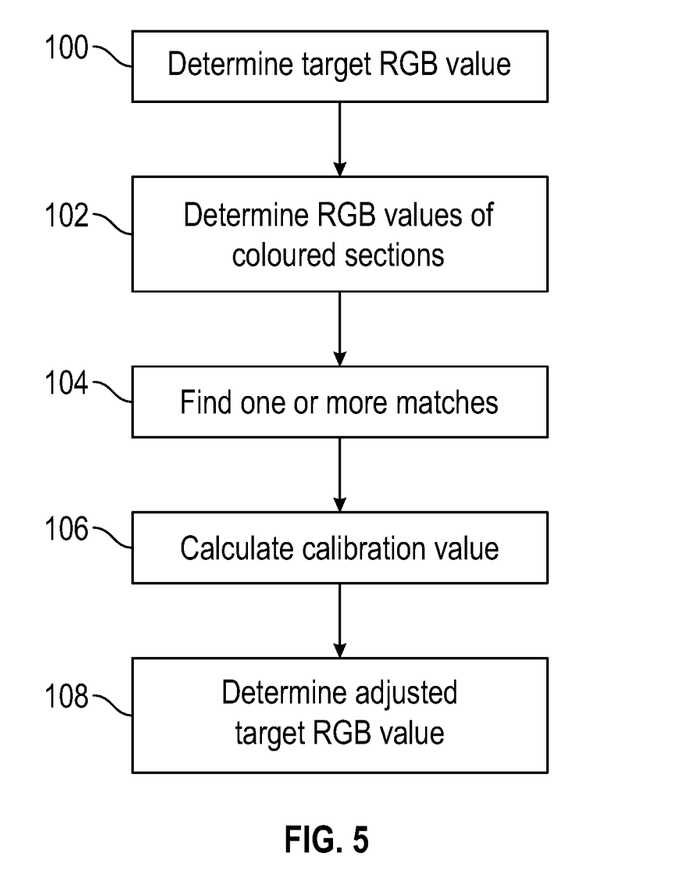
FIG. 5 is a flow diagram illustrating schematically some of the principal steps of a method according to an exemplary embodiment of the present invention.

Once the calibration value has been determined, it can be applied to the determined RGB value of the target, at step 108. In one exemplary embodiment, this may simply involve shifting the determined RGB value of the target by the calculated calibration value. In other exemplary embodiments, the determined RGB value of the target can be scaled according to the calibration value; in other words, the percentage represented by the difference value determined in respect of the colour section(s) can be used to adjust the RGB value of the target by the same percentage. It will be appreciated that other methods of calibration and adjustment using the difference value(s) are envisaged, and the present invention is not necessarily intended to be limited in this regard.

In some applications, once the adjusted RGB value of the target has been obtained, the processor module may be configured to search a database of colour samples to identify one or more closest matches, and display those matches on a screen. However, many different potential applications for the present invention are envisaged, and the present invention is not necessarily intended to be limited in this regards.

It will be appreciated by a person skilled in the art, from the foregoing description, that modifications and variations can be made to the described embodiments without departing from the scope of the invention, as defined by the appended claims. For example, in some exemplary embodiments, a digital camera (as an integral device of a mobile phone or computer tablet or as a stand-alone, internet-connected image capture device) may be used to simply capture an image of the screen overlayed on the target, and transmit the image data representative of to a remote processor for further processing (i.e. identification of the RGB values of at least some of the coloured sections, determination of an adjustment value, and adjustment of the measured RGB value of the target accordingly). In other exemplary embodiments, there may be no need for a viewfinder display, and instead, processing means may be provided to perform automatic alignment and identification of the individual coloured sections from within a captured image.

The invention claimed is:

1. A method for determining colour properties of a target, the method comprising:

provding an enclosure having first and second opposing end walls and one or more side walls, wherein said first end of said enclosure comprises a first screen having a first aperture therein and having, on its surface within said enclosure, a pattern of coloured sections arranged around said first aperture, wherein each coloured section has a known colour property, and wherein said second end of said enclosure comprises a second screen having a second aperture generally axially in line with said first aperture, no light source being provided within said enclosure;

placing said first screen over said target such that a portion of said target is exposed through said first aperture and said pattern of coloured sections is visible through said second aperture;

using a digital camera having a lens module, including a sensor, and a flash module adjacent each other, manually placing said lens module and flash module over said second aperture, directed into said enclosure such that substantially no ambient light can enter said enclosure through said second aperture, and, subsequently, substantially simultaneously illuminating, using only said flash module of said digital camera, said screen overlayed on said target and using said lens module to obtain sensor data representative of at least a portion of light reflected from said screen overlayed on said target and received by said sensor;

deriving, from said sensor data, reference parameters for the colour properties of said target exposed through said first aperture;

deriving, from said sensor data, reference parameters for the colour properties of at least one of said coloured sections;

determining a difference between a colour property of said at least one coloured section obtained from respective reference parameters derived therefor and a known colour property thereof; and using data representative of said difference to adjust a colour property of said target obtained from respective target parameters derived therefor.

2. A method according to claim 1, wherein said sensor data, or data representative thereof, is transmitted to a remote processing module, said remote processing module being configured to perform the steps of:

deriving, from said sensor data, reference parameters for the colour properties of said target exposed through said first aperture;

deriving, from said sensor data, reference parameters for the colour properties of at least one of said coloured sections;

determining a difference between a colour property of said at least one coloured section obtained from respective reference parameters derived therefor and a known colour property thereof; and using data representative of said difference to adjust a colour property of said target obtained from respective target parameters derived therefor.

3. A method according to claim 2, wherein said remote processing module includes a catalogue of libraries comprising data representative of respective digital cameras, said data comprising make, model and serial number of the respective digital camera.

4. A method according to claim 1, wherein said digital camera is integral with a mobile computing device.

5. A method according to claim 1, wherein a unique identifier is printed or otherwise provided on said pattern of coloured sections.

6. A method according to claim 1, wherein the pattern of coloured sections comprises an array of coloured sections, wherein said coloured sections are selected to represent at least a portion of a defined colour space.

7. A method according to claim 1, wherein the digital camera includes a viewfinder display, and the method includes the steps of causing to be displayed thereon, an image of said screen overlayed on said target, and adjusting the lens module so as to align said screen with a displayed image thereof on said viewfinder display.

8. A method according to claim 7, wherein the step of adjusting said lens module comprises superimposing a reference image on an image of said screen on said viewfinder display, and aligning said reference image with said coloured sections within said image.

9. A method according to claim 1, wherein the pattern of coloured sections comprises a colour grid and said reference image may be a grid outline corresponding generally to the configuration of said colour grid.

10. A method according to claim 1, wherein said target parameters include RGB values in respect of said target, and reference parameters include respective RGB values in respect of said coloured sections.

11. A method according to claim 10, wherein said known colour properties of said colour sections comprise respective RGB values, and said step of determining a difference comprises selecting a coloured section having a derived RGB value nearest to that of said target, and subtracting a derived RGB value from a corresponding known colour property; or wherein said known colour properties of said colour sections comprise respective RGB values, and said step of determining a difference value comprises selecting a plurality of coloured sections having respective RGB values nearest to said RGB value of said target, obtaining an average of said RGB values of said selected coloured sections, and subtracting said average from a corresponding average of said respective known RGB colour properties.

12. A method according to claim 1, wherein the step of adjusting a colour property comprises adjusting said colour property by said difference value; or wherein the step of adjusting a colour property comprises determining a scaling factor from said difference value in relation to the known RGB value(s), and applying said scaling factor to said derived target parameter.

13. Apparatus for determining colour properties of a target, the apparatus comprising:
an enclosure having first and second opposing end walls and one or more side walls, wherein said first end of said enclosure comprises a first screen having a first aperture therein and having, on its surface within said enclosure, a pattern of coloured sections arranged around said first aperture, wherein each coloured section has a known colour property, and wherein said second end of said enclosure comprises a second screen having a second aperture generally axially in line with said first aperture, no light source being provided within said enclosure, said enclosure being configured such that said first screen can be placed over said target, in use, such that a portion of said target is exposed through said first aperture and said pattern of coloured sections is visible through said second aperture;
a remote processing module; and
a digital camera having a lens module, including a sensor, and a flash module adjacent each other, for obtaining sensor data representative of at least a portion of light reflected from said screen overlayed on said target and received by said sensor and for transmitting said sensor data to said remote processing module;
said remote processing module being configured to
derive, from said sensor data, reference parameters for the colour properties of said target exposed through said first aperture;
derive, from said sensor data, reference parameters for the colour properties of at least one of said coloured sections;
determine a difference between a colour property of said at least one coloured section obtained from respective reference parameters derived therefor and a known colour property thereof; and
use data representative of said difference to adjust a colour property of said target obtained from respective target parameters derived therefor.

14. Apparatus according to claim 13, wherein the digital camera includes a viewfinder display configured, in use, to display thereon, an image of said screen overlayed on said target, and the apparatus is further configured to enable the lens module to be adjusted so as to align said screen with a displayed image thereof on said viewfinder display.

15. Apparatus according to claim 14, configured to superimpose a reference image on an image of said screen on said viewfinder display, and enable or cause said reference image to be aligned, manually or automatically, with said coloured sections within said image.

16. Apparatus according to claim 13, wherein the pattern of coloured sections comprises a colour grid and said reference image may be a grid outline corresponding generally to the configuration of said colour grid.

17. Apparatus according to claim 13, wherein the pattern of coloured sections comprises an array of coloured sections, wherein said coloured sections are selected to represent at least a portion of a defined colour space.

18. Apparatus for use in a method according to claim 1, comprising:
an enclosure having first and second opposing end walls and one or more side walls, wherein said first end of said enclosure comprises a first screen having a first aperture therein and having, on its surface within said enclosure, a pattern of coloured sections arranged around said first aperture, wherein each coloured section has a known colour property, and wherein said second end of said enclosure comprises a second screen having a second aperture generally axially in line with said first aperture, no light source being provided within said enclosure; and
a mobile application for use in a device including said digital camera comprising at least a lens module and a sensor, said mobile application being configured to, illuminate said screen overlayed on a target through said opening, and obtain sensor data representative of at least a portion of light reflected from said screen overlayed on said target.

19. Apparatus according to claim 18, wherein the mobile application is further configured to, in use, generate and superimpose, on a viewfinder display of said digital camera, a reference image corresponding to said pattern of coloured sections when viewed through said lens module and displayed as an image on said viewfinder display for enabling said lens module to be aligned relative to said screen, either manually by a user or automatically.

20. Apparatus according to claim 18, wherein said device comprises a light source and the mobile application is configured to automatically operate said light source to illuminate said screen through said opening, in use.

* * * * *